F. W. TOLLEY.
Cultivator.
No. 128,827.
Patented July 9, 1872.
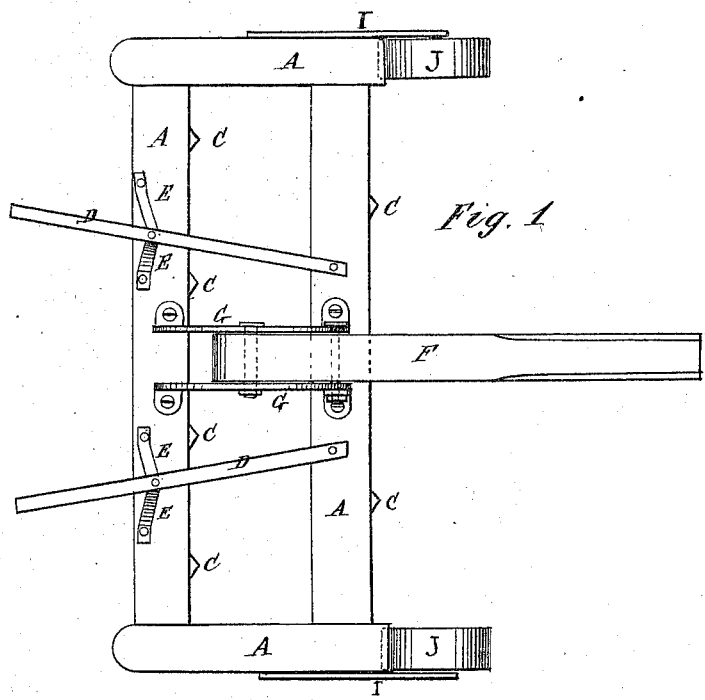
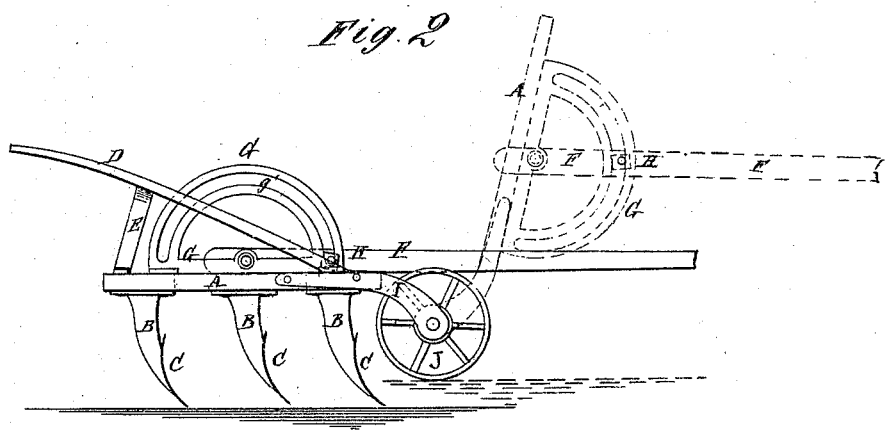
Witnesses:
A. W. Almquist
N. A. Graham
Inventor:
Frederick W. Tolley
Per
Attorneys.

UNITED STATES PATENT OFFICE.

FREDERICK W. TOLLEY, OF COXSACKIE, NEW YORK, ASSIGNOR TO HIMSELF AND ALBERT V. D. COLLIER, OF SAME PLACE.

IMPROVEMENT IN CULTIVATORS.

Specification forming part of Letters Patent No. 128,827, dated July 9, 1872.

Specification describing a new and useful Improvement in Cultivators, invented by FREDERICK W. TOLLEY, of Coxsackie, in the county of Greene and State of New York.

In the accompanying drawing, Figure 1 is a top view of my improved cultivator. Fig. 2 is a side view of the same.

Similar letters of reference indicate corresponding parts.

My invention has for its object to furnish an improved cultivator, which shall be so constructed that it may be conveniently transported from place to place; and it consists in the construction and combination of various parts of the machine to adapt it for this purpose.

A represents the frame of the machine, to which the standards B are attached. C are the cultivator-teeth, which are attached to the lower ends of the standards B. D are the handles, which are attached to the frame A and which are supported at the proper elevation by the braces E. F is the tongue, the rear end of which is pivoted to and between the bosses of the semicircular plates G, which have outwardly-projecting lugs formed upon their lower or straight edges, by which they are secured to the frame A. In the plates G, near and parallel with their curved edges, are formed curved slots $g'$ to receive the bolt H, which also passes through the tongue F, and is secured in place by a nut. To the forward ends of the side bars of the frame A are attached arms I, which project forward and incline or curve downward, as shown in Figs. 1 and 2, and to the forward ends of which are pivoted wheels J, which, when the machine is in working position, stand a little above the surface of the ground, ready, should the cultivator enter a dead furrow or encounter any other obstruction, to strike against it, and thus raise the cultivator into such a position as to pass over the said obstruction easily.

When it is desired to pass from one field or place to another the nut upon the bolt H is loosened and the frame of the cultivator turned forward to rest upon the wheels J, as shown in dotted lines in Fig. 2. and the nut upon the bolt H is tightened up so as to secure the said frame in position, when the cultivator may be drawn from place to place with the same facility as a cart. The device G $g'$ H also enables the cultivator to be adjusted as circumstances may require.

Having thus described my invention, I claim as new, and desire to secure by Letters Patent—

The arrangement of the arms I and wheels J, in connection with the frame A, tongue F, semicircular slotted plates G $g'$, and bolt H, substantially as herein shown and described, and for the purpose set forth.

FREDERICK W. TOLLEY.

Witnesses:
A. V. D. COLLIER, M. D.,
E. D. BRAMLOW.